(12) United States Patent
Doolan

(10) Patent No.: US 7,421,834 B1
(45) Date of Patent: Sep. 9, 2008

(54) ICE MEASURING AND DISPENSING APPARATUS

(76) Inventor: Desmond John Doolan, 46-60 Dickson Road, Morayfield (AU) 4506

(*) Notice: Subject to any disclaimer, the term of this patent is extended or adjusted under 35 U.S.C. 154(b) by 0 days.

(21) Appl. No.: 11/236,697

(22) Filed: Sep. 27, 2005

(51) Int. Cl.
  *B65B 43/26* (2006.01)
  *B65B 43/28* (2006.01)
  *B65B 43/54* (2006.01)
  *F25C 5/18* (2006.01)
  *G01F 11/10* (2006.01)

(52) U.S. Cl. .................. 53/570; 53/574; 53/284.7; 53/459; 62/344; 222/367; 222/452

(58) Field of Classification Search ............... 53/570, 53/564, 573, 574, 284.7, 385.1, 459, 273; 62/340, 344, 60; 222/146.6, 367, 368, 452, 222/456
See application file for complete search history.

(56) References Cited

U.S. PATENT DOCUMENTS

| | | | | |
|---|---|---|---|---|
| 2,151,283 A | * | 3/1939 | Stockdale | 141/133 |
| 3,151,668 A | * | 10/1964 | Zimmermann | 222/146.1 |
| 3,434,603 A | * | 3/1969 | Horman | 414/792.3 |
| 3,543,811 A | * | 12/1970 | Atkins et al. | 141/9 |
| 4,163,489 A | * | 8/1979 | Wahl | 222/56 |
| 4,478,140 A | * | 10/1984 | Bullock | 99/404 |
| 4,878,523 A | | 11/1989 | Balsamico et al. | |
| 5,088,300 A | * | 2/1992 | Wessa | 62/340 |
| 5,109,651 A | * | 5/1992 | Stuart | 53/502 |
| 5,191,918 A | * | 3/1993 | Cahlander et al. | 141/1 |
| 5,299,716 A | * | 4/1994 | Hawkins et al. | 222/146.6 |
| 5,303,672 A | * | 4/1994 | Morris | 119/51.11 |
| 5,581,982 A | * | 12/1996 | Schroeder et al. | 53/459 |
| 6,904,946 B2 | * | 6/2005 | James | 141/313 |

FOREIGN PATENT DOCUMENTS

EP    0 727 139    * 8/1996

* cited by examiner

*Primary Examiner*—Paul R Durand
(74) *Attorney, Agent, or Firm*—Parsons & Goltry; Michael W. Goltry; Robert A. Parsons

(57) ABSTRACT

An ice measuring and dispensing apparatus includes a rotating drum rotatable about a horizontal axis. The rotating drum has a plurality of chambers, and an ice supply hopper has a delivery opening for delivering ice into the plurality of chambers. A discharge tube to dispense ice from the plurality of chambers is also provided. The delivery opening of the supply hopper is larger than an opening of each of the chambers.

18 Claims, 7 Drawing Sheets

ICE MEASURING AND DISPENSING APPARATUS

FIELD OF THE INVENTION

This invention relates to an ice measuring and dispensing apparatus. In particular the invention relates to an ice measuring and dispensing apparatus that delivers ice into bags and therefore with be described in this context. However, it should be appreciated that the ice measuring and dispensing apparatus may be used for other purposes such as the bulk batch measuring and delivery of ice onto vessels such as ships.

BACKGROUND OF THE INVENTION

Ice is used throughout the world for cooling of many goods. This may include the cooling of food and beverages. In most instances, ice is transported to a desired location in plastic bags. Bags are convenient as any water produced from melting ice is contained in the bag. Further, the ice is able to be easily distributed as the bags can be easily split.

The manual packing of bags with ice is very time consuming. Hence ice bagging machines have been produced to quickly and effectively bag ice. Most ice bagging machines have at least one chamber that is filled with ice from a hopper and then transferred into a bag. It is important that the quantity of ice that is dispensed in a bag is arcuate to provide consumers with the amount of ice they are assume they are purchasing. Therefore the chamber that dispenses ice is of a precise volume.

A major difficulty associated with the bagging of ice is bridging of ice within the hopper. Bridging occurs when pieces of ice located adjacent each other stick together to form a wall within the hopper. This prevents chamber from being entirely filled and subsequently this causes the bags to be under filled with ice.

In order to address this problem, many hoppers have been constructed with a vibration device such as that shown in U.S. Pat. No. 4,878,523. This vibration device vibrates the hopper in order to agitate the pieces of ice so they do not stick to each other. Generally, the vibration device operates effectively to prevent bridging. However, to operate effectively the vibration must be strictly controlled. If the level of vibration is not maintained, then bridging of ice within the hopper can occur. Further, the vibration device makes the ice bagging machine more expensive to purchase and to maintain.

OBJECT OF THE INVENTION

It is an object of the invention to overcome or alleviate one or more of the above disadvantages or provide the consumer with a useful or commercial choice.

SUMMARY OF THE INVENTION

In one form, although not necessarily the only or broadest form, the invention resides in an ice measuring and dispensing apparatus comprising:

a rotating drum rotatable about a horizontal axis, the rotating drum having a plurality of chambers; and an ice supply hopper having a delivery opening for delivering ice into the plurality of chambers; and a discharge tube to dispense ice from the plurality of chambers wherein the delivery opening of the supply hopper is larger than an opening of each of the chambers.

Preferably the rotating drum has two chambers.

Preferably the chambers are variable in volume. The chambers may have a leading wall and a trailing wall, the leading wall being shorter in length than trailing wall. Preferably, the leading wall and the trailing wall are moveable with respect to each other.

In another form, the invention resides in an ice bagging machine comprising:

an ice measuring and dispensing apparatus having a rotating drum rotatable about a horizontal axis, the rotating drum having a plurality of chambers; an ice supply hopper having a delivery opening for delivering ice into the plurality of chambers; and a discharge tube to dispense ice from the plurality of chambers, the delivery opening of the supply hopper being larger than an opening of each of the chambers; and an ice bagging apparatus having a bag loader for placing a bag under the discharge outlet, a bagging platform to support the bag, a tying device to tie the bag and a gripper to place the bag into the tying device.

Preferably the rotating drum has two chambers.

Preferably the chambers are variable in volume. The chambers may have a leading wall and a trailing wall, the leading wall being shorter in length than trailing wall. Preferably, the leading wall and the trailing wall are moveable with respect to each other.

Preferably the bag loader includes two loading tines that extend rearwardly from adjacent the end of the discharge tube to mount bags. The bag loader may also include a blower to blow open the bags. Further, the bag loader may include a pivotal flap located on the adjacent end of the discharge tube, the pivotal flap able to be moved between an insert position and a fill position.

The bagging platform may include a plurality of belts that are located around at least two rollers. The bagging platform may also include a plurality of fingers for supporting the bag above the belts. The fingers may be pivotally movable between a loading position and a transport position. The bagging platform may be height adjustable. A lifting ram may be used to adjust the height of the bagging platform.

The gripper may include a gripper head to grip a bag, the gripper head having a at least one gripping arm; at least one gripper arm ram to move the gripper arm between a bag holding position and a release position and a main gripper ram to move the gripper head between a first position and a second position.

The gripper head may be formed from a block that rotatably mounts a pair of gripping arms.

Preferably, linking arms are attached to respective gripping arms and to respective gripper arm rams.

The main gripper ram may move the gripper head between a bag engagement position and a bag tying position.

In yet another form the invention resides in a gripper for gripping a bag, the gripper comprising:

a gripper head to grip a bag, the gripper head having a at least one gripping arm;

at least one gripper arm ram to move the gripper arm between a bag holding position and a release position and a main gripper ram to move the gripper head between a first position and a second position.

The gripper head may be formed from a block that rotatably mounts a pair of gripping arms.

Preferably, linking arms are attached to respective gripping arms and to respective gripper arm rams.

The main gripper ram may move the gripper head between a bag engagement position and a bag tying position.

BRIEF DESCRIPTION OF THE DRAWINGS

Embodiments of the invention will now be described with reference to the accompanying drawings in which.

DETAILED DESCRIPTION OF THE PREFERRED EMBODIMENTS

Figure 1:
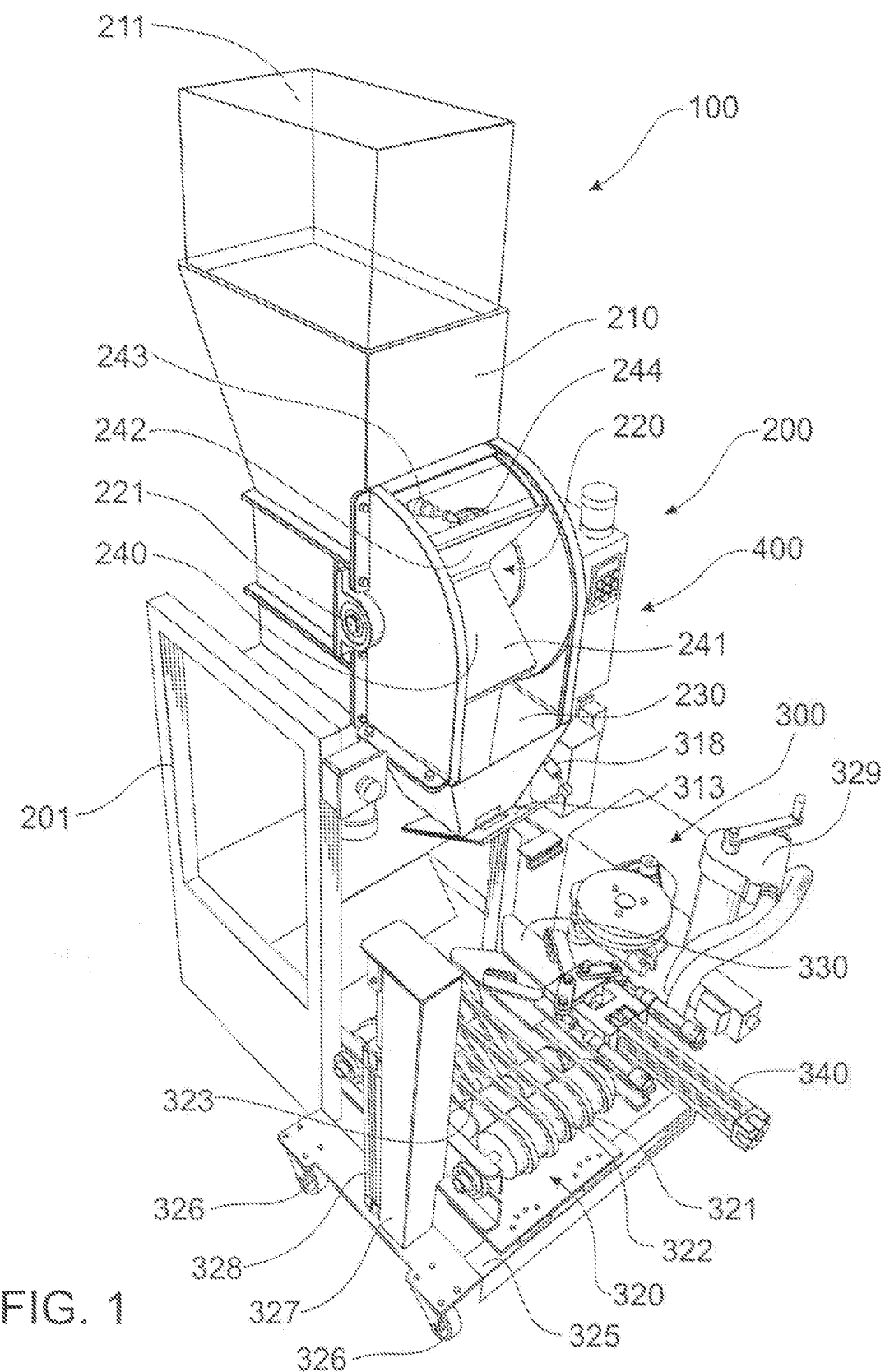
FIG. 1 is a perspective view of an ice bagging machine according to an embodiment
Figure 2:
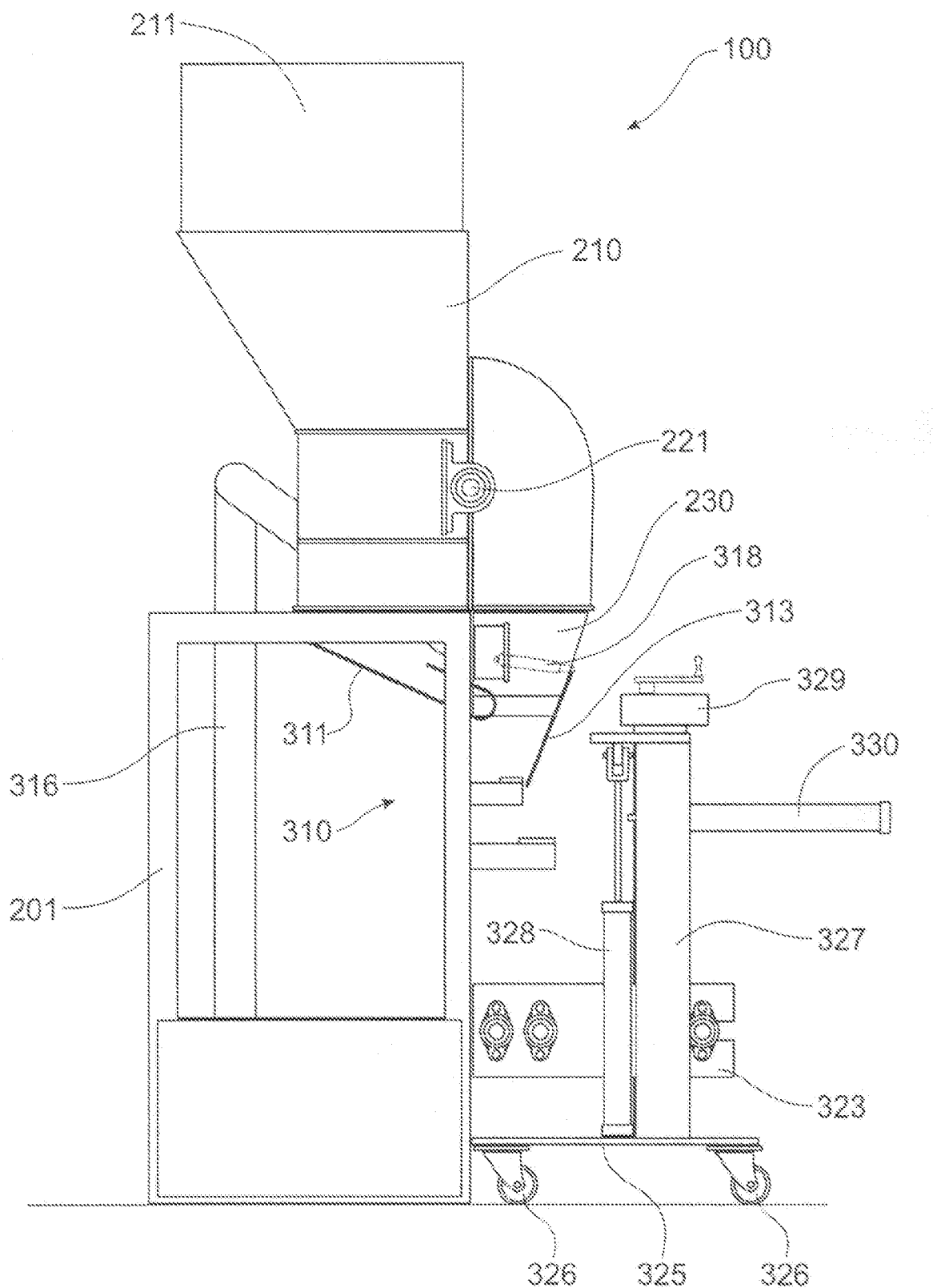
FIG. 2 is a side view of an ice bagging machine according to FIG. 1
Figure 3:
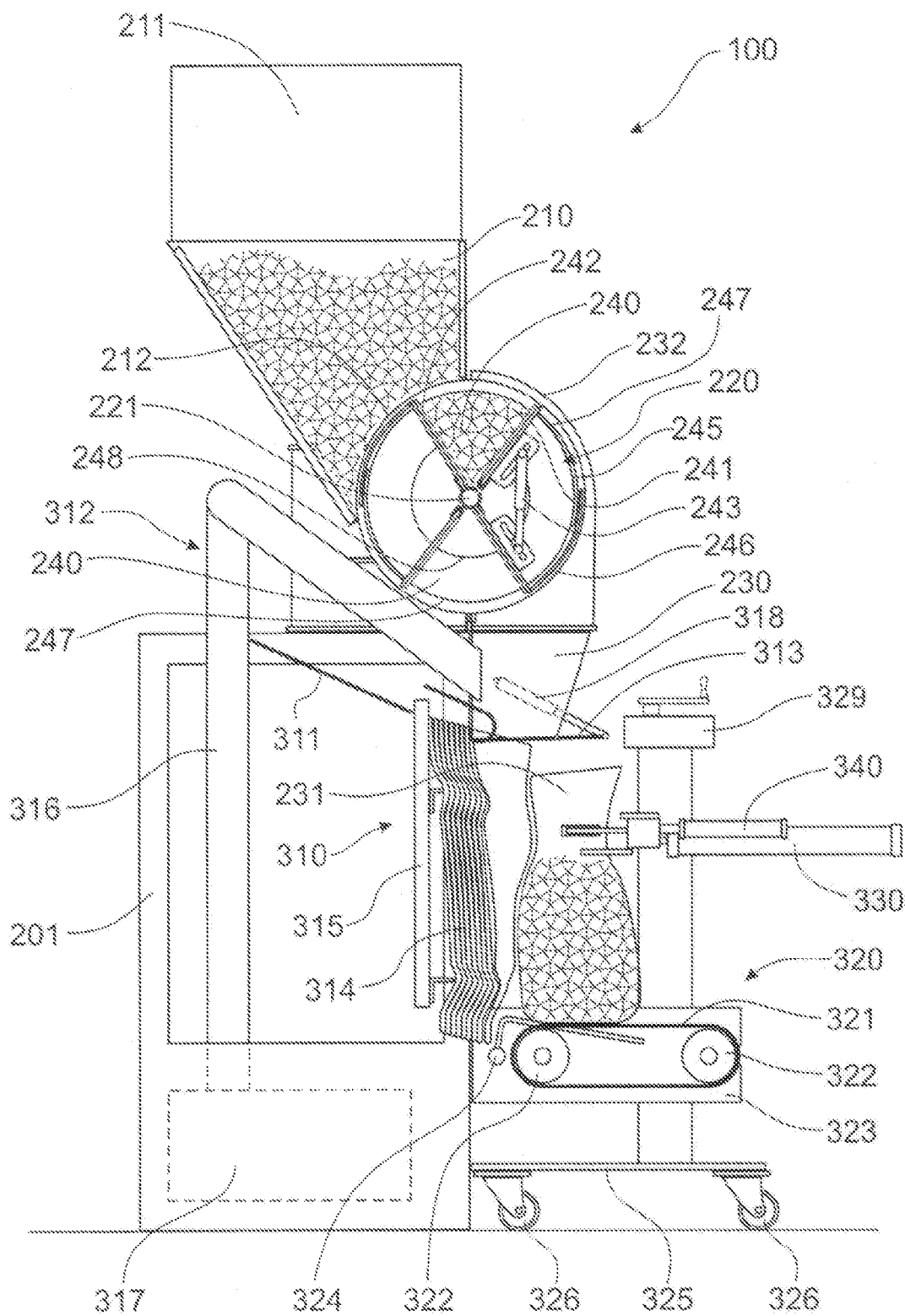
FIG. 3 is a side sectional view an ice bagging machine according to FIG. 1
Figure 4:
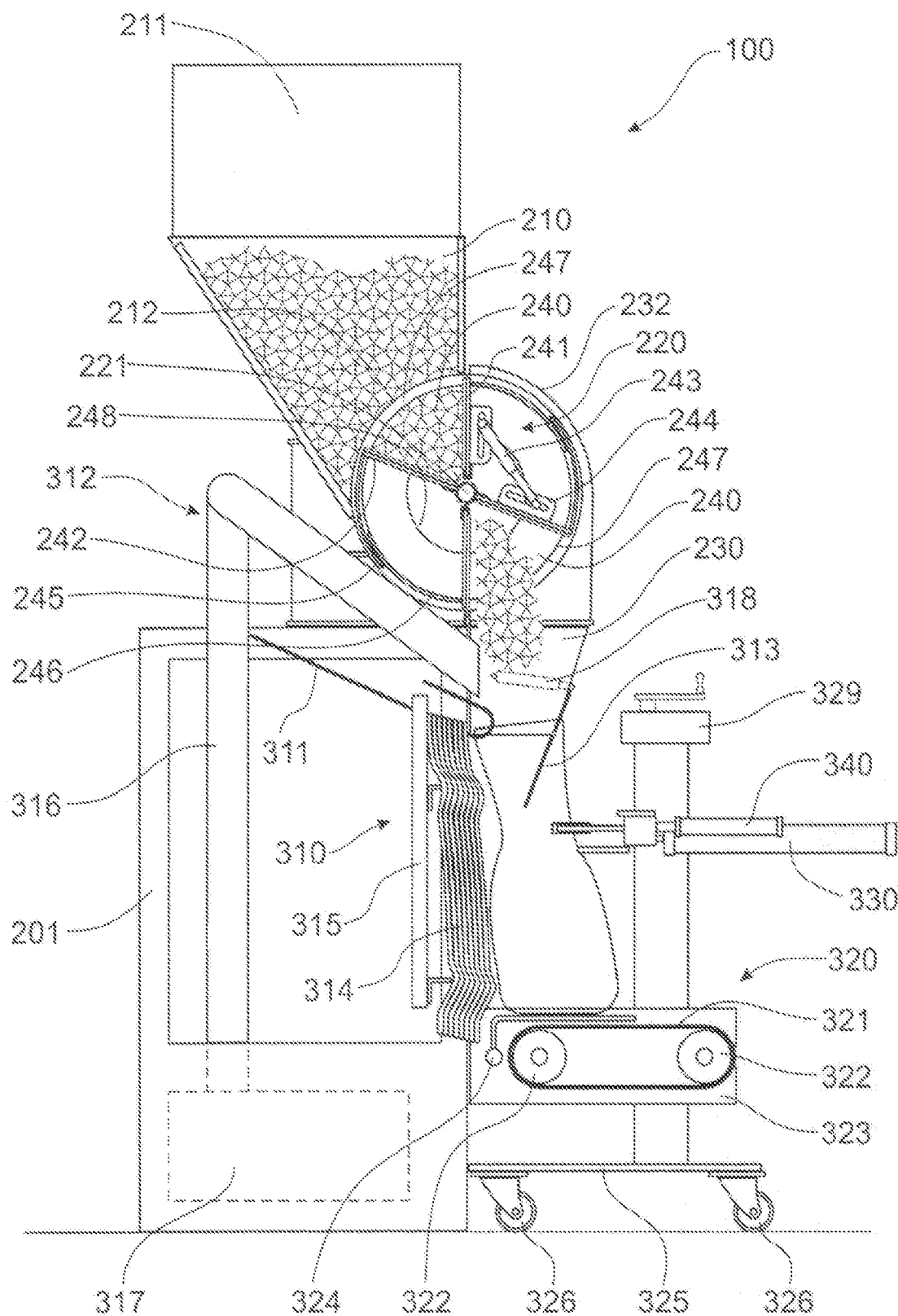
FIG. 4 is a further side sectional view an ice bagging machine according to FIG. 1
Figure 5:
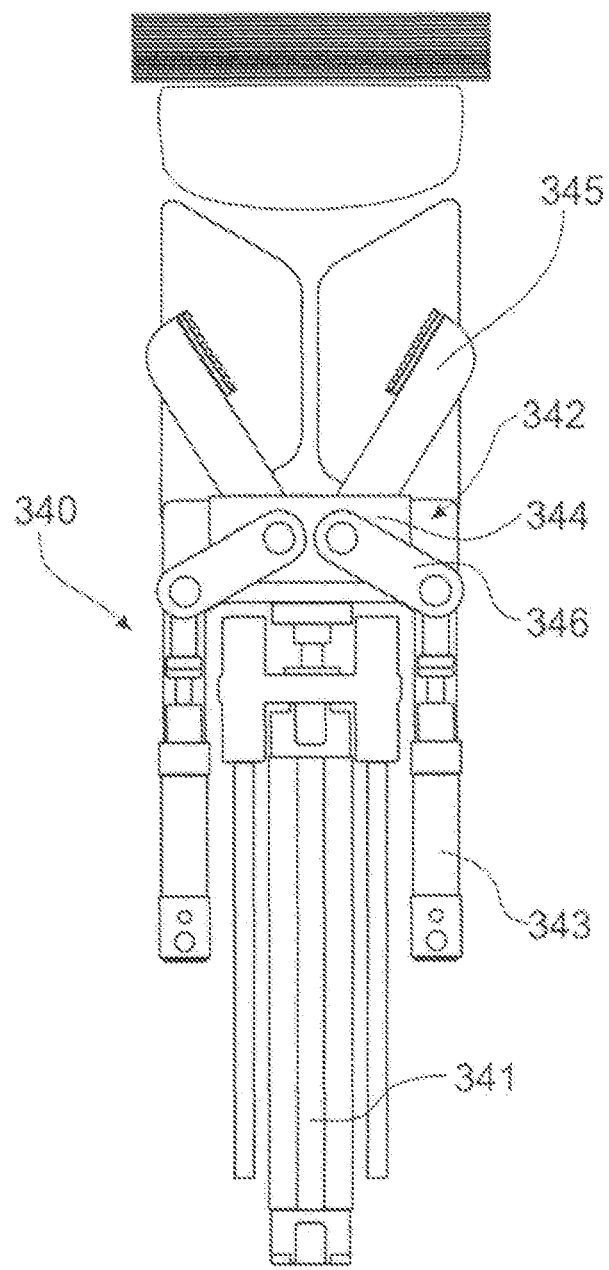
FIGS. 5 to 8 are top views of a gripper showing the different operational steps of the gripper.
Figure 6:
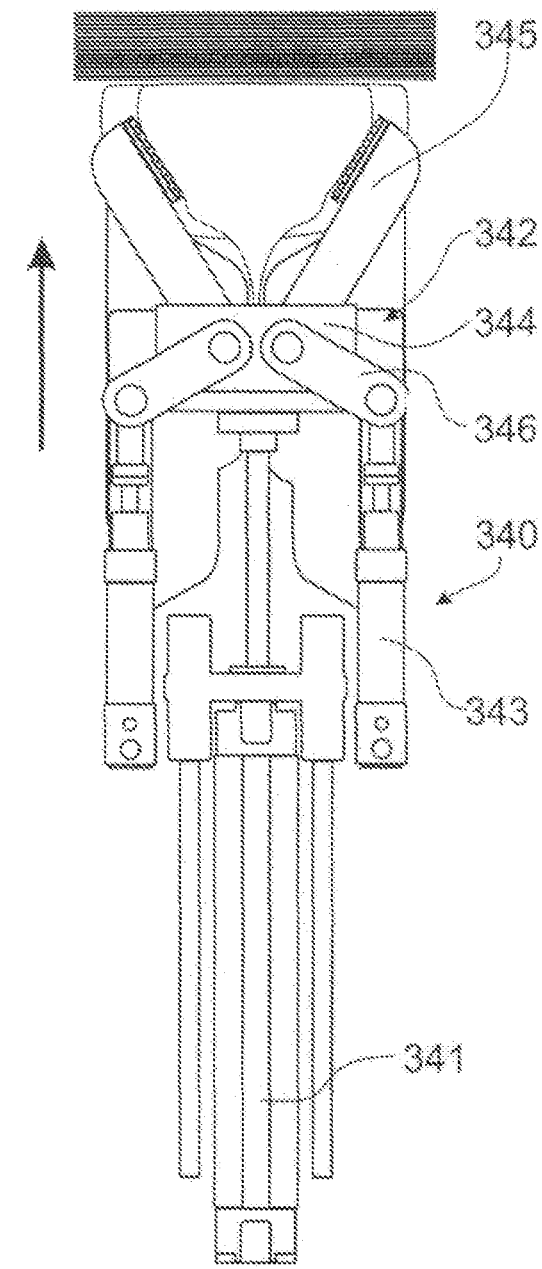
Figures 7, 8:
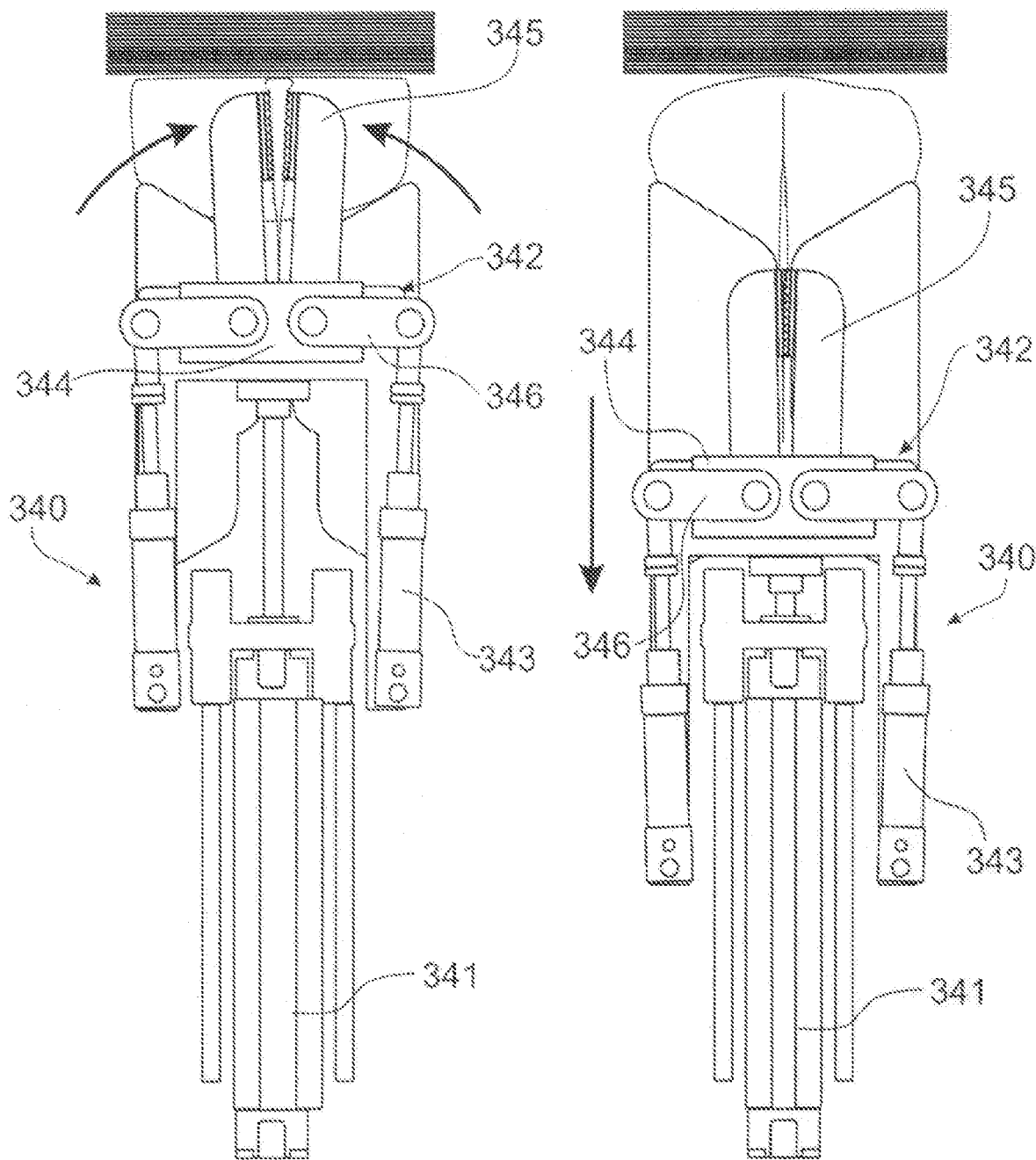

FIG. 1 shows a perspective view of an ice bagging machine 100. The ice bagging machine 100 includes an ice measuring and dispensing apparatus 200, an ice bagging apparatus 300 and a control unit 400.

The ice measuring and dispensing apparatus 200 includes an ice supply hopper 210, a rotatable drum 220 and a discharge tube 230. The rotatable drum 220 is mounted to a horizontal shaft 221. The rotatable drum 220 is able to rotate about a horizontal axis that extends through the shaft 221. An electric motor (not shown) is used to rotate the horizontal shaft 221 and hence the rotatable drum 220.

Figure 9:
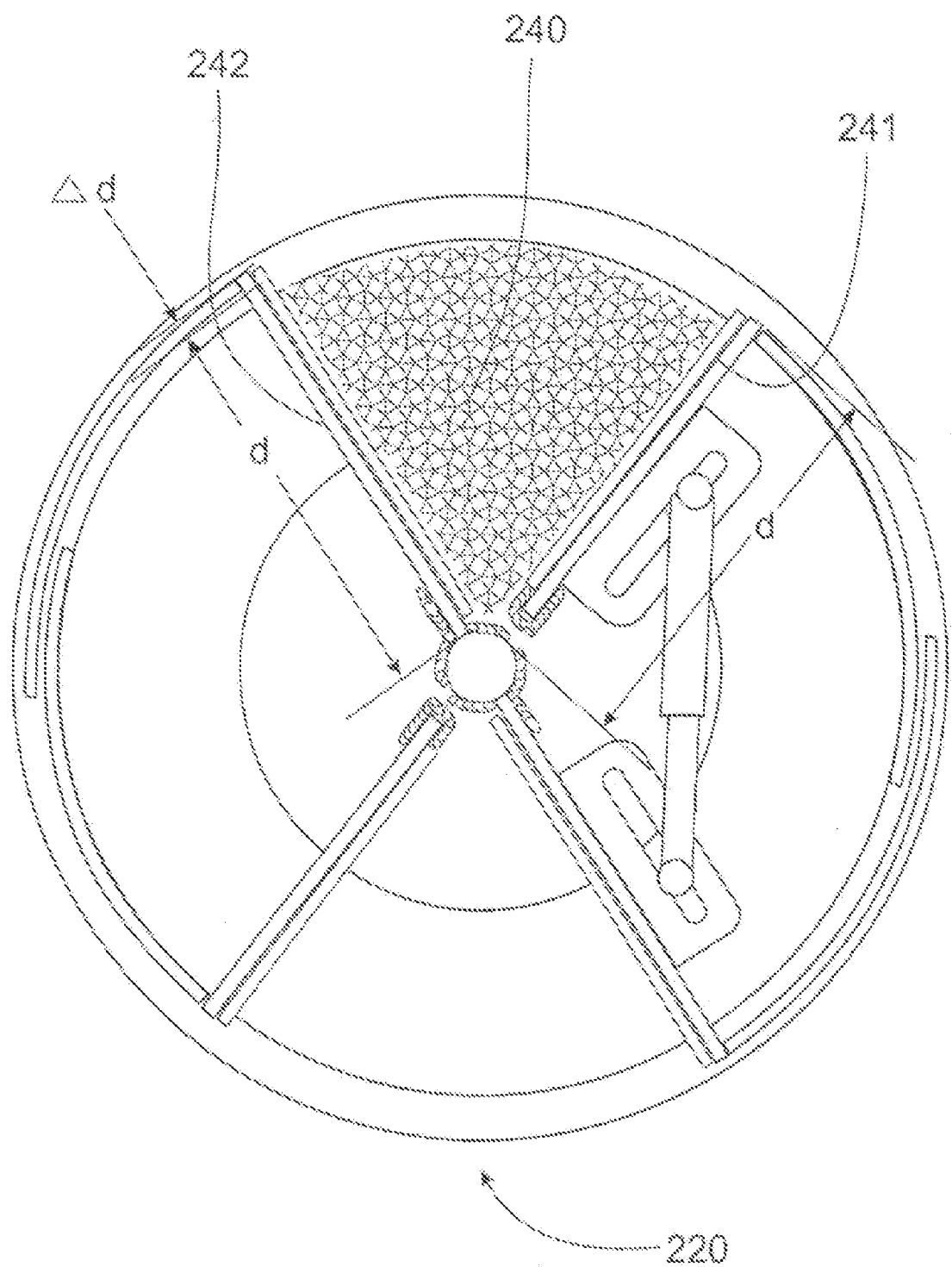
FIG. 9 is an expanded view of a rotating drum showing a trailing chamber wall being slightly longer than a leading chamber wall.

Two chambers 240 are located in the rotatable drum. Each of the chambers is formed from a leading chamber wall 341 and a trailing chamber wall 242. As illustrated in FIG. 9, the trailing chamber wall 242 is slightly longer than the leading chamber wall 241. The trailing chamber walls 242 are welded to the horizontal shaft 221 whilst the leading chamber walls 241 are pivotally mounted to an inner plate 248 that pivots about the horizontal shaft 221. A volume of each of the chambers 240 is able to be varied by moving the leading chamber wall 241 with respect to the trailing chamber wall 242. A chamber pneumatic ram 243 is connected to the leading wall 241 and the trailing wall 242 via chamber pneumatic ram connection plates 244. The chamber pneumatic ram 243 may be extended or retracted to move the leading chamber walls 241 with respect to the trailing chamber walls 242 to vary the volume of each of the chambers 240. It should be appreciated that the connection of the chamber pneumatic ram 243 to the connection plates 244 may be varied to also change the volume of each of the chambers 240.

A leading arcuate wall 245 extends outwardly from the leading chamber wall 241 whilst a trailing arcuate wall 246 extends outwardly from the trailing chamber wall 242. The leading arcuate walls 245 and trailing arcuate walls 246 overlap. The extent of the overlap is dependant on the position of the leading chamber walls 241 with respect to position of the trailing chamber walls 242. The smaller the volume of the chambers 240, the less of an overlap between the leading arcuate walls 245 and the trailing arcuate walls 246. The leading arcuate walls 245 and the trailing arcuate walls 246 protect the chamber pneumatic rams 243.

The ice supply hopper 210 is located on a stand 201. The ice supply hopper has an open top 211 to allow ice to be fed into the ice supply hopper 210. Ice is normally supplied to the ice supply hopper 210 using an auger to provide a constant flow of ice. However, the ice may be fed into the ice supply hopper 210 by any other means.

A delivery opening 212 is located at the base of the ice supply hopper 210. The rotatable drum 220 is positioned so that ice located within the ice supply hopper 210 can only fall into the chambers 240 of the rotatable drum 220. A width of the delivery opening 212 of the ice supply hopper 210 is larger than the width of respective openings 247 of the chambers 240.

The ice discharge tube 230 is located adjacent the ice supply hopper 210 and the rotatable drum 220 to dispense ice from the chambers 240. A discharge opening 231 is located at an end of the discharge tube 230. A top 232 of the ice discharge tube 230 encloses the openings 247 of the chambers 240 as they rotate.

The ice bagging apparatus 300 comprises a bag loader 310, a bagging platform 320, a tying device 330 and a gripper 340. The bag loader 310 includes two loading tines 311 that extend rearwardly from adjacent the end of the discharge tube 230, a blower 312 and a pivotal flap 313 located on the adjacent end of the discharge tube. Bags 314 are located on the tines 311 with associated holes located in the bags 314. A rectangular holder 315 is located over the tines to push the bags toward the end of the tines 311. The blower 312 includes a pipe 316 that extends from an air supply 317 to adjacent the discharge tube 230. The blower 312 blows the bags 314 to an open position. The pivotal flap 313 is connected to a flap pneumatic ram 318 to pivot the flap 311 between an insert position and a fill position.

The bag loading platform 320 includes five belts 321 that are located around two rollers 322. The rollers 322 are rotatably mounted to and between two C-shaped sections 323. The rollers are powered by an electric motor (not shown). Six pivotally mounted fingers 324 are pivotally mounted to and between the two C-shaped sections 323. The fingers 324 are located adjacent a roller 322 and extend between the five belts 321. A finger pneumatic ram (not shown) is used to pivot the fingers 324 between a loading position and a transport position 325.

A base, mounted to wheels 326, is located below the rollers. A stem 327 extends upwardly from the base. A lifting ram 328 extends adjacent the stem 327. The lifting ram 328 is connected to the C-shaped sections 323 and used to change the height of the C-shaped sections with respect to the base 325. An adjustment member 329 also extends upwardly from the stem. The adjustment member 329 is used to adjust the height of the gripper and tying device with respect to the C-shaped sections. The adjustment member 329 includes a handle connected to a screw threaded shaft (not shown). The screw threaded shaft is connected to the tying device 330 so that rotation of the screw threaded shaft causes the tying device to be moved upwardly or downwardly.

A tying device 330 is used to place ties around the bags. The tying device is a standard Hamer tying device. The tying device is attached to adjustment member 328 that extends upwardly from the base.

The gripper 340 is connected to the tying device 330. The gripper 340 includes a main gripper ram 341, a gripper head 342 and a pair of gripper arm rams 343. The gripper head 342 is mounted to the main gripper ram 341. The main gripper ram 341 moves the gripper head 342 between a bag engagement position and a bag tying position. The gripper head 342 is formed from a block 344 that rotatably mounts a pair of gripping arms 345. Linking arms 346 are attached to respective gripping arms 345 and to respective gripper arm rams 343. The pair of gripper arm rams 343 moves the gripper arms 344 between a bag holding position and a bag release position.

A control unit 400 controls the operation of all of the rams and the electric motors via a programmable logic controller. The control unit also is connected to a sensor (not shown) on the rotatable drum to determine number of rotations of the rotatable drum 220 hence the number of bags filled and the amount of ice dispatched.

In use, the ice bagging machine 100 operates by first filling the ice supply hopper 210 with a level of ice. The rotating drum 220 rotates and ice falls through the delivery opening 212 through the opening in the chamber 240. The chamber 240 rotates until ice falls into and through the distribution tube 230.

As the chamber is filled, a bag 314 is blown open by the blower 312. The fingers 324 are moved from a transport position that allows the release of a bag to a loading position to support the bag and holds the remaining bags between the fingers 324 and the rectangular holder 315. The pivotal flap 311 is moved from an insert position in which the bag 314 is blown over the pivotal flap to a fill position in which the bag 314 is held open. Ice falls through the distribution tube 230 into the bags and fills the bag 314.

Once the bag 314 is filled, the gripper 340 is activated and the main gripper head is moved from a gripper tying position to a gripper bag engagement position. The gripper arm rams 343 then move the gripper arms 345 from a bag release position to a bag holding position to grip the bag 314. The main gripper head 342 is then moved from the gripper bag engagement position to the gripper tying position. The gripper arm rams 343 are then moved to the release position to place the bag 314 onto the Hamer tying device.

At the same time, the fingers 324 are pivoted from the loading position to the transport position. When the fingers 324 move from the loading position to the transport position, the filled bag contacts the belts 321 and the bag 314 is transported via the belts. Once the bag is tied, the bag falls off the belts 321 where the bag 314 is ready for the distribution to wholesalers and/or retailers.

The control unit 400 can be used to select different bag sizes. For example, if a 3 kg bag is required the bag size is selected, the chamber pneumatics rams 343 connected to the leading walls 245 and trailing walls 242 are moved so that the volume of the chamber is equivalent to 3 kg of ice. The lifting ram connected to the C-shaped section is also activated so that the fingers 314 and rollers 322 with associated belts 321 are moved to a height so that the bag 314 is supported. Further, if larger bags of ice are required, such as 10 kg bags, ice is dispensed by two chambers before the bag is gripped and tied. The control unit 400 therefore is programmed to activate the rams, such as used on the gripper, at appropriate times.

The ice dispensing and measuring apparatus 200 assists in preventing bridging without the need for a vibration device. It is envisaged that the bridging of ice is restricted due to the size of the delivery 212 opening within the hopper and the leading wall of the chamber being smaller than the trailing wall. Further it is envisaged that If bridging does occur then the trailing wall may contact any bridge and break the bridge to cause the chamber to be filled to its entirety due to the leading wall being a of shorter length.

It should be appreciated that the ice dispensing and measuring apparatus 200 is not limited to use on an ice bagging machine. For example, the ice dispensing and measuring apparatus may be used to load vessels, such as fish boats, with a precise amount of ice. For example, a fishing boat is to be loaded with 1000 kg of ice and each chamber is set to a 5 kg volume, then 100 rotations of the rotatable drum are required. The control unit is able to be used to dispense the correct measurement of ice by counting the revolutions and stopping the machine at 100 rotations.

It should be appreciated that the various other changes and modifications may be made to the embodiment described with departing from the spirit or scope of the invention.

The invention claimed is:

1. An ice measuring and dispensing apparatus comprising:
    a rotating drum rotatable about a horizontal axis, the rotating drum having a plurality of chambers;
    an ice supply hopper having a delivery opening for delivering ice into the plurality of chambers;
    a discharge tube to dispense ice from the plurality of chambers;
    the delivery opening of the supply hopper is larger than an opening of each of the chambers; and
    the chambers have a leading wall and a trailing wall, the leading wall being shorter in length than the trailing wall;
    wherein the leading wall and the trailing wall are moveable with respect to each other.

2. The ice measuring and dispensing apparatus of claim 1 wherein the rotating drum has two chambers.

3. The ice measuring and dispensing apparatus of claim 1 wherein the chambers are variable in volume.

4. An ice bagging machine comprising:
    an ice measuring and dispensing apparatus having a rotating drum rotatable about a horizontal axis, the rotating drum having a plurality of chambers; an ice supply hopper having a delivery opening for delivering ice into the plurality of chambers; and a discharge tube to dispense ice from the plurality of chambers, the delivery opening of the supply hopper being larger than an opening of each of the chambers;
    an ice bagging apparatus having a bag loader for placing a bag under the discharge outlet, a bagging platform to support the bag, a tying device to tie the bag and a gripper to place the bag into the tying device; and
    each chamber has a leading wall and a trailing wall, the leading wall being shorter in length than the trailing wall;
    wherein the leading wall and the trailing wall are moveable with respect to each other.

5. The ice bagging machine of claim 4 wherein the rotating drum has two chambers.

6. The ice bagging machine of claim 4 wherein the chambers are variable in volume.

7. The ice bagging machine of claim 4 wherein the bag loader includes two loading tines that extend rearwardly from adjacent the end of the discharge tube to mount bags.

8. The ice bagging machine of claim 4 wherein the bag loader includes a blower to blow open bags.

9. The ice bagging machine of claim 4 wherein the bag loader includes a pivotal flap located on the adjacent end of the discharge tube, the pivotal flap able to be moved between an insert position and a fill position.

10. The ice bagging machine of claim 4 wherein the bagging platform includes a plurality of belts that are located around at least two rollers.

11. The ice bagging machine of claim 10 wherein the bagging platform includes a plurality of fingers for supporting the bag above the belts.

12. The ice bagging machine of claim 11, wherein the fingers is pivotally movable between a loading position and a transport position.

13. The ice bagging machine of claim 4 wherein the bagging platform is height adjustable.

14. The ice bagging machine of claim 13 wherein a lifting ram is used to adjust the height of the bagging platform.

15. The ice bagging machine of claim 14 wherein the gripper comprises a gripper head to grip a bag, the gripper head having at least one gripping arm; at least one gripper arm ram to move the gripper arm between a bag holding position and a release position and a main gripper ram to move the gripper head between a first position and a second position.

16. The ice bagging machine of claim 15 wherein the gripper head is formed from a block that rotatably mounts a pair of gripping arms.

17. The ice bagging machine of claim 16 wherein linking arms are attached to respective gripper arms and to respective gripper arm rams.

18. The ice bagging machine of claim 17 wherein the main gripper ram moves the gripper head between a bag engagement position and a bag tying position.

* * * * *